United States Patent [19]

Zerlaut et al.

[11] 4,423,469
[45] Dec. 27, 1983

[54] SOLAR SIMULATOR AND METHOD

[75] Inventors: Gene A. Zerlaut; William T. Dokos; William J. Putman, all of Phoenix; Russell K. Skousen, Chandler, all of Ariz.

[73] Assignee: DSET Laboratories, Inc., Phoenix, Ariz.

[21] Appl. No.: 285,493

[22] Filed: Jul. 21, 1981

[51] Int. Cl.³ .............................................. F21V 9/02
[52] U.S. Cl. .......................................... 362/2; 362/1;
362/236; 362/230; 362/285; 362/287; 362/293;
362/250; 362/252; 362/419; 362/427; 362/428
[58] Field of Search ....................... 362/1, 2, 250, 236,
362/230, 285, 287, 293, 252, 419, 427, 428

[56] References Cited

U.S. PATENT DOCUMENTS

3,247,367  4/1966  Rayces ................................ 362/1 X
3,321,620  5/1967  Miles et al. ........................... 362/1
4,220,981  9/1980  Koetler .............................. 362/250

Primary Examiner—Stephen J. Lechert, Jr.
Attorney, Agent, or Firm—Cahill, Sutton & Thomas

[57] ABSTRACT

A solar simulator includes a lamp array of solar lamps pivotally connected to an array frame. The array frame is rotatably and pivotally mounted on a gantry crane, the elevation and lateral position of which are adjustable relative to the position of a solar collector to be tested. The solar simulator maintains the plane of the lamp array parallel to the plane of the test device for all elevations, lateral positions and rotational positions of the lamp array, and controls tilting of the lamps relative to the array frame to any desired angle of incidence. The solar simulator is operated to control the angle of incidence of radiation received by the solar collector to be tested and to vary the distance from the array of lamps to the solar collector in such a manner that the intensity of received radiation along the surface of the test device is uniform, thereby avoiding undesirable lateral gradients in temperature along the surface of the test device. The solar simulator allows accurate simulation of a solar day without reducing the power to solar lamps, to avoid undesirable variation in the spectrum of radiation produced by the solar simulator. A test stand holding the solar collector includes a movable horizontal bar supporting a plurality of uniformly spaced radiation intensity sensors. The bar is vertically moved, enabling the radiation intensity profile along the entire surface of the solar collector to be accurately and repeatably measured.

13 Claims, 11 Drawing Figures

SOLAR SIMULATOR AND METHOD

BACKGROUND OF THE INVENTION

The invention relates to solar simulators for simulating radiation received from the sun in order to test solar collectors and to test the effect of solar radiation on materials.

In recent years there has been a rapid growth in the use of solar energy, especially in the use of flat solar collectors for receiving radiation from the sun and converting it to heat water for use in hot water heaters and the like. Numerous flat collectors have been developed and introduced to the residential and commercial markets. In order to accurately determine efficiency and reliability of the various solar collectors that have been introduced, it has been necessary to develop meaningful testing methods and standards in order to enable engineers to accurately measure performance of solor collectors in response to incident solar radiation in order to allow them to improve their designs and also to enable buyers of solar collectors to compare the performance of the various available solar collectors.

In the past, outdoor solar collector testing has been performed. However, varying and inclement weather conditions have prevented an acceptable degree of repeatability of test results obtained using the outdoor collector techniques. The wide variations in seasonal weather conditions throughout the United States and the rest of the world make it difficult or impossible to achieve uniform outdoor standardized testing conditions.

Therefore, it is an object of this invention to provide a device and method for accurately simulating solar radiation to be received by a solar collector.

In order to accurately test solar collectors, it would be desirable to be able to accurately simulate a solar day for any particular geographical location in which a solar collector might be installed outdoors and also to accurately simulate solar performance for any particular season, so that "worst case" and "best case" and typical performance of the collector so installed can be accurately predicted.

Therefore, it is another object of the invention to provide a solar simulator and method which are capable of accurately simulating a predetermined solar day.

Solar simulators including stationary arrays of lamps have been utilized for testing materials used in spacecraft for many years. In some instances, such solar simulators have been used for testing the performance of solar collectors. However, during a typical solar day, the amount of radiation received by the collector is not constant, since the angle of incidence and the intensity of radiation received from the sun varies from morning to evening. (Most solar collectors of the type through which hot water is circulated in order to heat the water are mounted in fixed positions, so the incoming solar radiation is perpendicular to the face of the collector only at noon during certain months.) The stationary solar lamp arrays are incapable of simulating this type of performance, even if the orientation of the plane of the radiation-receiving surface of the solar collector under test is varied, due to the fact that such variation causes different points on the radiation-receiving surface to be at unequal distances from the plane of the lamp array. This in turn causes the intensity of the received radiation to vary along the surface of the solar collector, producing thermal gradients that cause the performance of the collector being tested to be significantly different than would be the case if the incoming radiation were produced by a distant "point source".

Therefore, it is yet another object of the invention to provide a solar simulator and method of operating that provides varying angles of incidence of received radiation and yet avoids occurrances of undesired thermal gradients along the surface of the collector being tested.

In the past, the above mentioned stationary solar simulators have been operated to compensate for the non-variability of the angle of incidence relative to the radiation-receiving collector under test by reducing the amount of power delivered to the solar lamps, thereby decreasing the intensity of radiation received at the surface of the collector uniformly to simulate the reduction in intensity of received radiation that occurs as the angle of incidence of the received radiation increases. However, this approach has the disadvantage that power reductions in some types of solar lamps causes an "unnatural" shift in the frequency spectrum emitted thereby, resulting in inaccuracies in measuring the performance of the collector under test.

Therefore, it is yet another object of the invention to provide a solar simulator and method of testing that avoids shifts in the spectrum of radiation received by a collector being tested as solar performance is simulated.

An important factor in accurately simulating actual outdoor collector performance on a perfect day is the amount of re-radiation of energy from the surface of the collector back into space. The amount of re-radiation depends largely on a parameter referred to as the "sky temperature", which is typically ten to thirty degrees Fahrenheit below the ambient temperature around the collector under test.

Therefore, it is a further object of the invention to provide a solar simulator and operating method that accurately causes re-radiation of energy from the surface of a solar collector being tested.

SUMMARY OF THE INVENTION

Briefly described, and in accordance with one embodiment thereof, the invention provides a solar simulator for producing a radiation spectrum that approximates the sun's spectrum and including a plurality of spaced solar lamps that are individually pivotally connected to an array frame and are pivotal in a plurality of orientations relative to a plane of the array frame so that the direction axes of each of the solar lamps are parallel and light emitted along each of the direction axes has equal angles of incidence on a light receiving surface of a test object, such as a flat plate solar collector under test.

In the described embodiment of the invention, the array frame is pivotally connected about a horizontal pivot axis to a vertically and horizontally movable support. The horizontally and vertically movable support is carried by a gantry crane that moves sideways on a pair of rails on a floor of an environmentally controlled building in which the solar simulator is housed. The array frame is rotatably mounted on the vertically and horizontally movable support. When the test object has been positioned and the array frame has been tilted so that the faces of all of the solar lamps lie in a plane parallel to the light-receiving surface of the test object, the array frame can be rotated. A plurality of lamp troughs, each pivotally connected to the array frame, each contain a respective group of the solar lamps and partially surround each solar lamp in that group and guide cooling air past those solar lamps to conduct heat therefrom and exhaust the heat outside of the building. A transparent infrared filter is disposed between the solar lamps and the light-receiving surface of the test object in order to filter a predetermined amount of infrared radiation from the radiation flowing to the radiation-receiving surface of the test object to make the spectrum of light received by the light-receiving surface more closely approximate the sun's solar spectrum. A blower for blowing cooling air on the surface of the infrared filter maintains the infrared filter at a temperature that causes the radiation-receiving surface to be presented with a temperature that approximates the normal sky temperature to which outdoor mounted collectors are ordinarily exposed when the outdoor temperature is at a level equal to the present ambient temperature in the building near the test object.

In one embodiment of the invention, the intensity of radiation received from the solar lamps is periodically measured along a plurality of points distributed along the light-receiving surface of the test object. The distance along the respective direction axes of the solar lamps between various points of the light-receiving surface of the test object and light-emitting surfaces of respective ones of the solar lamps are equal and are adjusted to a level so that a predetermined, uniform intensity of radiation exists along the radiation-receiving surface of the test object.

DESCRIPTION OF THE INVENTION

Referring to the drawings, particularly FIGS. 1-4, solar simulator 1 includes an adjustable lamp array 3 containing a large number of directionally adjustable solar lamps, such as 61 (FIG. 4) mounted on a lamp array frame 39, a pivot base 33, a lamp array support 5 to which pivot base 33 is pivotally attached, and a simulator stand 7, also referred to as gantry crane 7. Gantry crane 7 includes a pair of horizontal members 9 each supported by a pair of wheels 11. Wheels 11 can roll on and are supported by two horizontal rails 15 attached to a floor surface 17. A motor 13 causes wheels 11 to roll forward or backward along rails 15 in response to control signals received from a control source (not shown). A pair of vertical members 19 are rigidly attached to horizontal members 9 of gantry crane 7, and each supports a lower sprocket 21 and an upper sprocket 23. Each pair of sprockets 21, 23 supports a continuous chain 25. Lower sprockets 21 are powered by a motor 53 that is connected by means of a mechanical linkage represented by dotted line 53' to lower sprockets 21. Control signals to motor 53 cause chains 25 to move in either of the directions indicated by arrows 29A.

Figure 1:
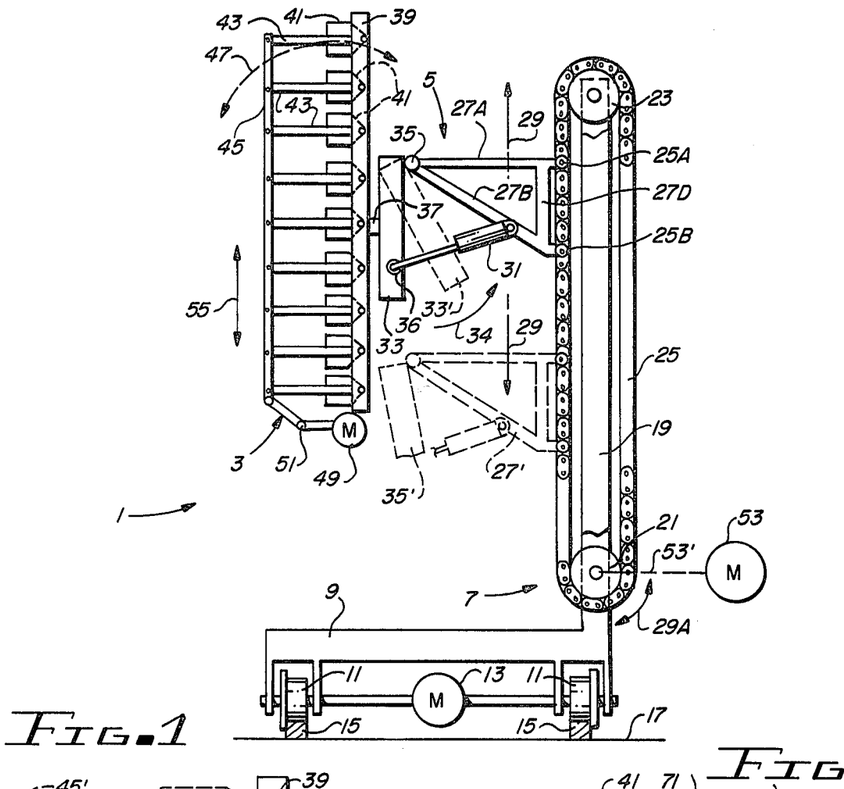
FIG. 1 is a side view of the solar simulator of the present invention.
Figure 1A:
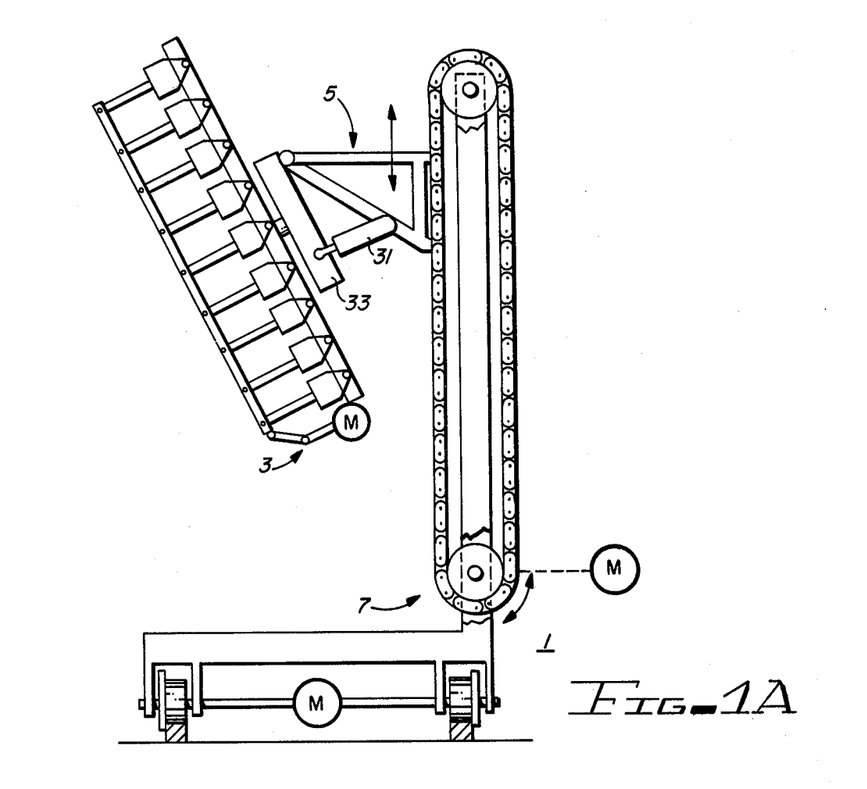
FIG. 1A is a side view of the solar simulator shown in FIG. 1 with the lamp array tilted downward.

Lamp array support 5 includes a pair of horizontal members 27A, a pair of inclined members 27B, a pair of vertical members 27D, and a pair of horizontal cross members 27C that are connected to provide a rigid, triangular structure having a pivot bearing 35 at the apex thereof. The triangular structure 5 is connected at the base thereof to points 25A and 25B of chain 25. Thus, as sprockets 21, 23 are caused to rotate in response to motor 53, the elevation of lamp array support 5 is altered in the directions indicated by arrows 29.

Figure 5:
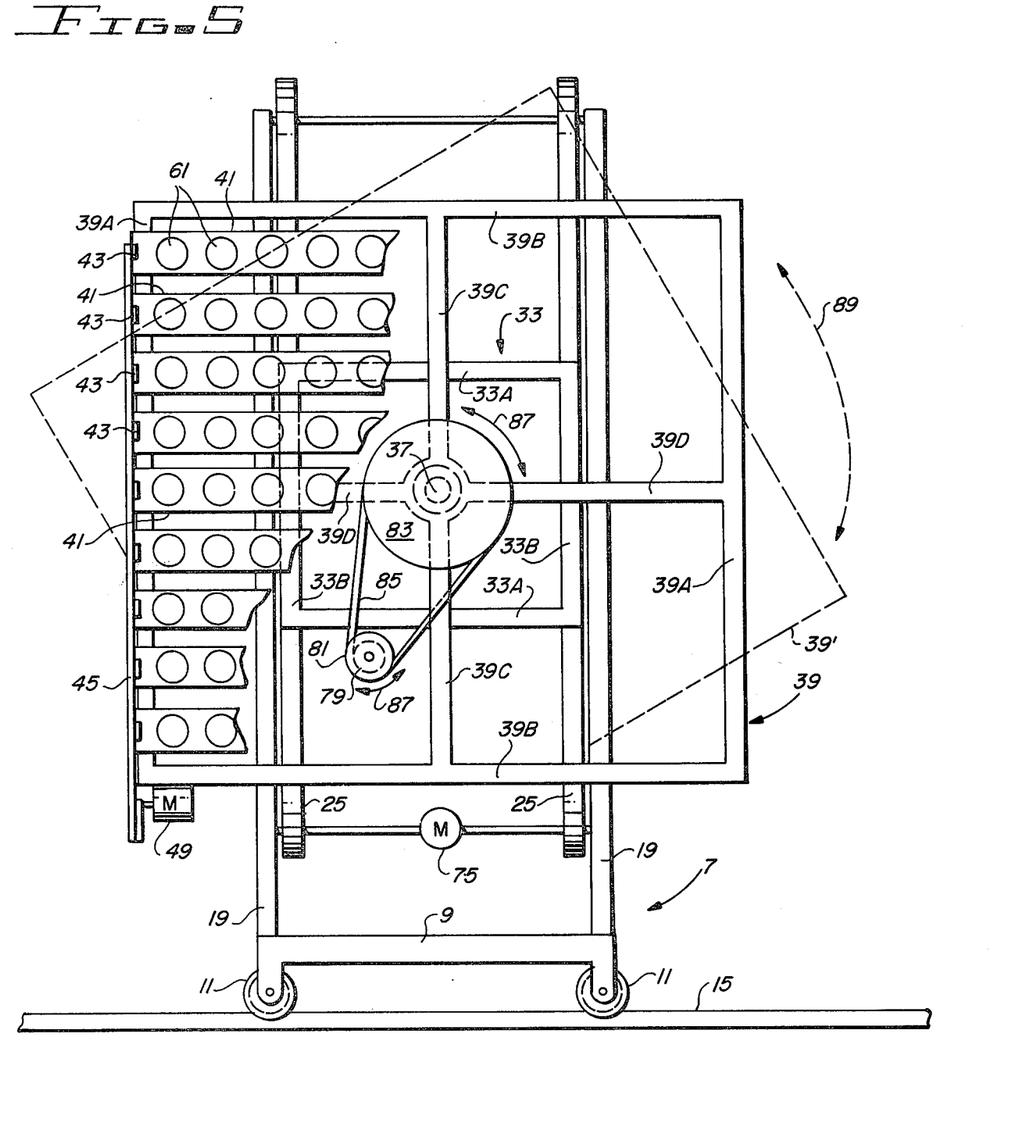
FIG. 5 is a partial cutaway front view of the solar simulator of FIG. 1.

Lamp array frame 39 is rotatably mounted on pivot base 33, as best seen in FIG. 5. Lamp array frame 39 includes vertical side members 39A, horizontal top and bottom members 39D, and cross members 39C connecting top and bottom members 39B to sprocket 83. Cross members 39D connect vertical members 39A to sprocket 83. Pivot base 33 is pivotally attached at its upper member 33A by means of horizontal pivot bearing 35 to the apex of triangular lamp array frame support 5. As indicated by dotted lines 33' in FIG. 1, lamp frame base 33 can pivot 30 degrees from either side of vertical in the directions indicated by arrow 34. Such pivoting is accomplished by means of pneumatic cylinder 31, the body of which is pivotally connected to the lower portion of one of inclined members 27B. The piston of pneumatic cylinder 31 is pivotally connected at point 36 to the lower portion of one of vertical members 33B of pivot base 33.

Thus, it is seen that pivot base 33 can pivot relative to lamp array 5 about a horizontal axis. As best seen in FIG. 5, a motor 79 is rigidly attached to lower member 33A of pivot base 33. The shaft of motor 79 drives a sprocket 79 that is coupled by means of chain 85 to a larger sprocket 83. Sprocket 83 is rigidly attached to cross members 39C and 39D of lamp array frame 39, causing it to rotate in the directions indicated by arrow 87 in response to controlled rotation of sprocket 81 in the directions indicated by arrows 87 in response to motor 79. Arrows 89 and dotted lines 39' indicate how lamp array frame 39 rotates relative to pivot base 33, which remains stationary, in response to motor 79.

At this point, it can be seen that lamp array 3 is pivotally and rotationally movable relative to simulator stand 7. Furthermore, lamp array 3 is laterally movable along rails 15 relative to test stand 91, shown in FIGS. 6, 8 and 9.

Figures 2, 3, 4:
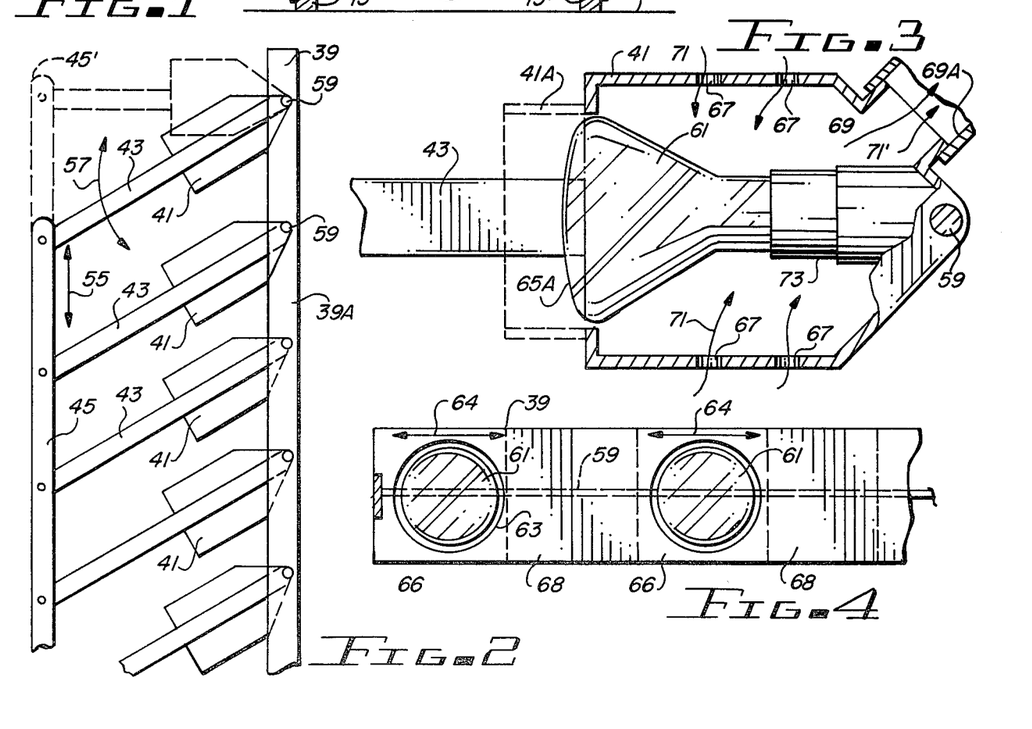
FIG. 2 is a partial side view of the lamp array of the solar simulator of FIG. 1.
FIG. 3 is a partial section view of one lamp trough of the solar simulator of FIG. 1.
FIG. 4 is a partial plane view of the light emitting face of one lamp trough of the device of FIG. 1.

As shown in FIG. 1, lamp array 3 includes a plurality of lamp troughs 41 arranged in spaced rows. Each of lamp troughs 41 includes a plurality of lamps 61, as best seen in FIGS. 4 and 5. Each of lamp troughs 41 is pivotally connected by a pivot rod 59 to vertical lamp array frame members 39A (FIG. 5). Each of lamp troughs 41 has a lever arm 43 attached to its opposed ends. When the lever arms 43 are moved in the directions indicated by arrow 57 (FIG. 2), the respective lamp troughs 51 pivot about pivot rods 59, as shown in FIG. 2 by dotted lines 45'. The free end of each of lever arms 43 is pivotally connected to a movable common member 45 that moves in the directions indicated by arrows 55 in response to movement of a linkage 51 (FIG. 1). Linkage 51 is caused to move in response to motor 49 to control the tilt angle of each of lamp troughs 41.

The structure of lamp troughs 41 is best understood by reference to FIGS. 3 and 4, wherein it is seen that each trough includes a plurality of solar lamps 61, which may be compact source iodide (CSI) 1000 watt lamp that produce a light spectrum very similar to the optical spectrum of the sun as filtered by the earth's atmosphere. Each of solar lmaps 61 has a direction axis perpendicular to and passing through the center of the light emitting circular face of that lamp. The total of the rays of light emitted by each lamp 61 form a frusto-conical shape, but the summation of all of the light emitted by all of lamps 61 produces approximately the same result as if all emitted light from lamp array 3 is parallel to the direction axes. This lamp can be obtained from Thorn Lighting, Limited of the United Kingdom. A plurality of air inlet holes 67 are disposed along the opposed side faces of each of lamp troughs 41, allowing air to be drawn into the interior of the lamp troughs 41, as indicated by arrow 71, to cool the lamps 61. The base portion of each of troughs 41 has an air outlet 69, to which a flexible air hose 69A is connected. An air pump, not shown, draws air out of each of lamp troughs 41, thereby causing cool air drawn through inlets 67 to continually cool all of the lamps 61 in each lamp trough 41.

If desired, collars such as 41A, indicated in dotted lines in FIG. 3, can be provided to aid directing the beam of light emitted by each of lamps 61.

As shown in FIG. 4, each of lamps 61 is laterally movable in the directions indicated by arrows 64. A face plate 66 having an aperture 63 therein covers the face of each of lamp troughs 41 around the face of the respective solar lamps 61. Solid panels 68 are provided between face plates 66, so that the entire front surface of each of troughs 41 is covered. This design ensures that cooling air will be drawn in mostly through the above mentioned side inlet holes 67 to efficiently cool the bases and sockets 73 of the various solar lamps 61. In accordance with the present invention, the positions of lamp sockets 73 are laterally adjustable.

In practice, the solar simulator 1 and test stand 91 (see FIG. 10) are installed inside a large environmentally controlled building designated by dotted lines 66. The above mentioned air pump, designated by reference numeral 60 in FIG. 10, exhausts the air drawn through outlet openings 69 in the direction indicated by arrows 71' in FIG. 4 and guides the air outside of the environmental building 66.

In the presently constructed embodiment of the invention, the solar simulator of FIG. 1 is approximately 28 feet tall, and the building in which it is constructed is somewhat higher. The height and width of the lamp array 3, as shown in FIGS. 1 and 5, is approximately twelve feet by fourteen feet. The height of the bottom of lamp array 3 is controllable to vary in elevation from floor 17 to a height of thirteen feet. Simulator stand 7 can travel laterally approximately 35 feet on rails 15.

Figure 6:
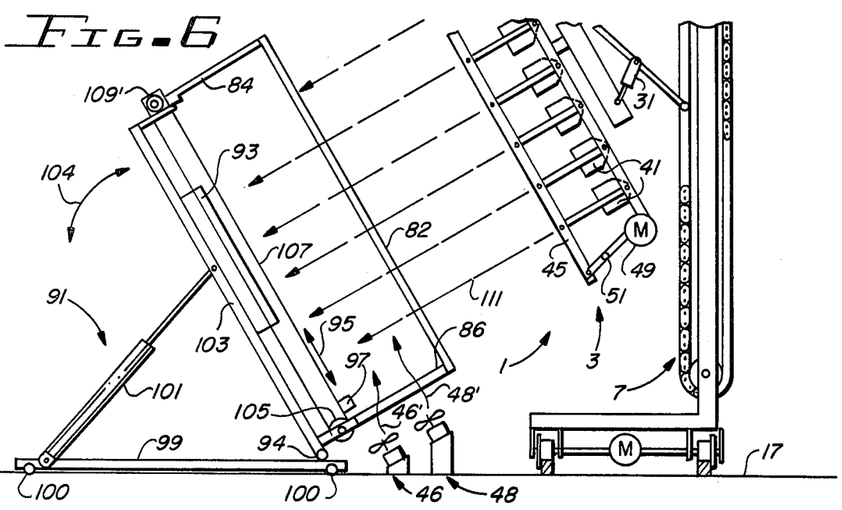
FIG. 6 is a partial side view illustrating the solar simulator of FIG. 1 and a test rack for holding a solar collector being tested.
Figure 8:
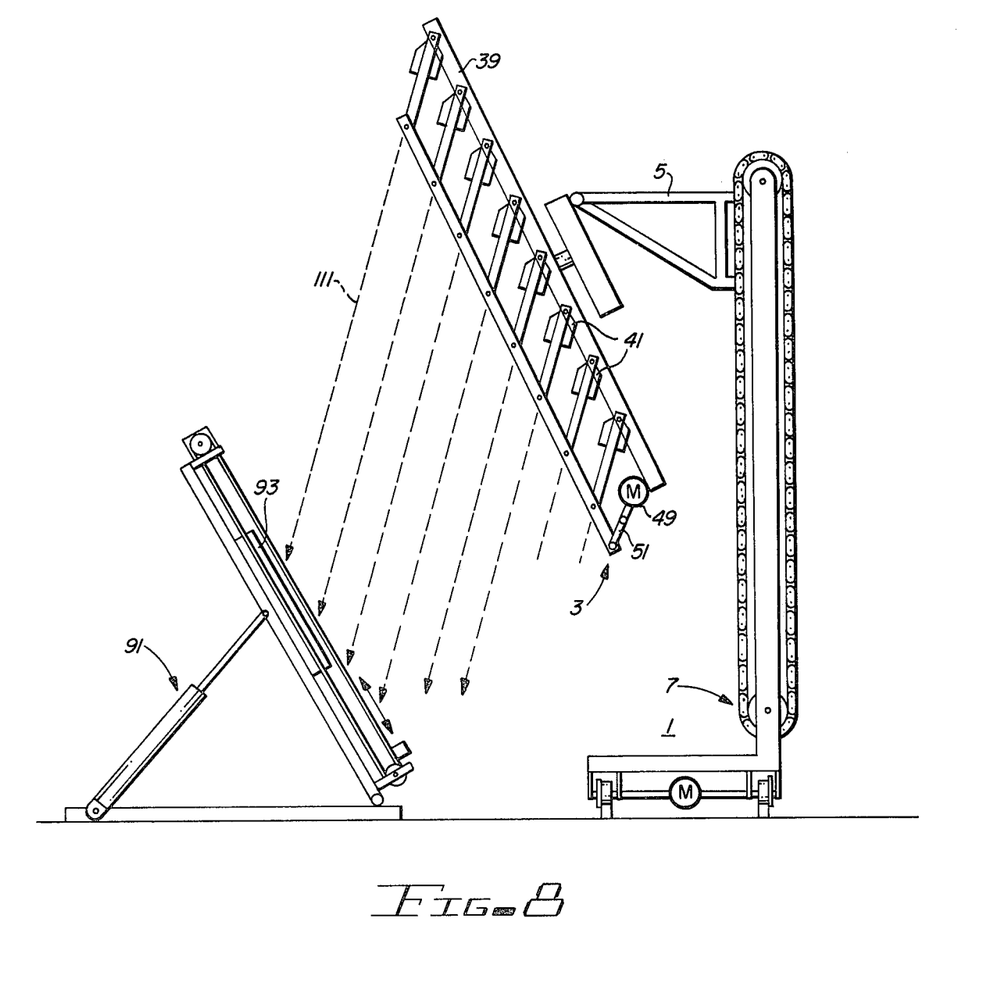
FIG. 8 is a side view of the solar simulator and a test stand adjusted to provide a particular angle of incidence upon the solar collector supported by the test stand.
Figure 9:
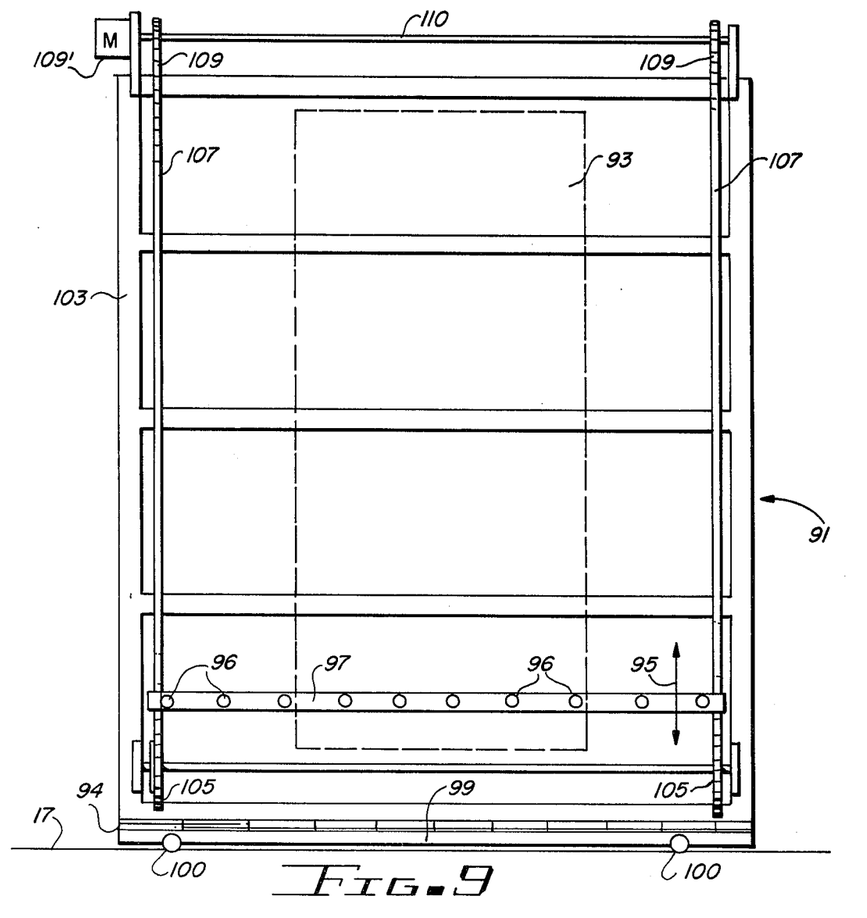
FIG. 9 is a front view of the test stand shown in FIGS. 6 and 8.

As shown in FIGS. 6, 8 and 9, test stand 91 has a base 99 mounted on casters 100 that rest on floor 17. A support member 103 is pivotally attached by means of pivot bearing 94 to the front end of base 99. As best seen in FIG. 9, support member 103 includes a pair of opposed members lying in a pair of parallel vertical planes. Support member 103 also includes a plurality of rigid cross members, as shown. The cross members support a test object 93, which typically is a solar collector of the type having a water inlet and a water outlet for use in conjunction with solar hot water heaters or other heating systems.

A pair of continuous chains 107 are supported at their upper ends by a pair of sprockets 109, respectively, and at their lower ends by a pair of sprockets 105. The upper sprockets 109 are driven by means of a motor 109'. A horizontal sensor support bar 97 is attached to chains 107. A plurality of radiation intensity sensors referred to as pyronometers and indicated by reference numerals 96 in FIG. 9, are installed at twelve inch intervals along sensor support bar 97. As motor 109' is controllably driven, the position of sensor bar 97 is caused to move in the directions indicated by arrows 95. Thus, test stand 91 has the capability of positioning radiation sensors 96 over every square foot of collector under test 93, enabling the system of the present invention to accurately determine the distribution of the received light intensity impinging on the radiation receiving surface of test collector 93.

It can be seen that the angle of orientation of the test unit 93 can be varied in the directions indicated by arrows 104 in FIG. 6 by varying the extension of pneumatic cylinder 101, which is pivotally attached at one end to support member 103 and at its lower end to base 99. The distance between test stand 91 and solar simulator 1 can be varied by allowing casters 100 to roll on floor surface 17 toward or away from solar simulator 1.

As shown in FIG. 6, the elevation and orientation of lamp array 3 can be controlled by means of the above mentioned motors to cause the simulated solar radiation 111 to impinge perpendicularly on the face of solar collector 93. This can be easily accomplished by positioning gantry crane 7 immediately in front of test stand 91, actuating motor 79 (FIG. 5) so that lamp array frame 39 is oriented such that lamp troughs 41 are all horizontal. Motor 49 can be actuated so that the axis of each of lamps 61 is perpendicular to the plane of lamp array frame 39. The lamp array 3 is tilted (by means of pneumatic cylinder 31) so that the plane of lamp array 3 is parallel to the plane of solar collector 93. Then, of course, the light intensity across the entire surface of solar collector under test 93 is uniform if solar lamps 61 are all of equal intensity and are distributed at approximately uniform spacings in lamp troughs 41. This situation corresponds to a typical winter noon-hour orientation for a solar collector mounted on the roof of a building. The uniformity of intensity of radiation along the entire surface of solar collector under test 93 ensures that there will be no lateral temperature gradients along the surface of solar collector 93. (As previously mentioned, such gradients cause inaccurate, unrealistic testing of the solar collector 93.)

Figure 7:
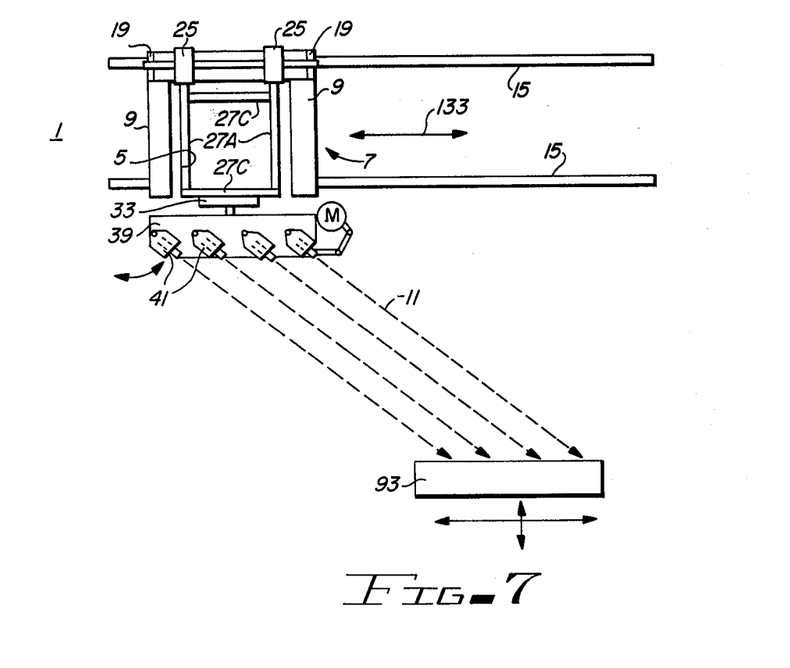
FIG. 7 is a diagrammatic top view of the solar simulator of FIG. 1 illustrating its use to illuminate a test object.

FIG. 7 discloses one manner in which the angle of incidence of the incoming solar radiation 111 relative to the solar collector under test 93 can be varied without causing a significant variation in the uniformity of intensity of received radiation along the surface of solar collector 93. As indicated in FIG. 7, the entire solar simulator 1 is moved to the left on rails 15, relative to test collector 93. Lamp array frame 93 is rotated by a predetermined angle, as indicated best in FIG. 5, and the orientation of each of lamp troughs 41 is also varied by a predetermined angle, so that the radiation 111 simulates parallel rays of light, all of which are of equal length between the solar lamp from which they are emitted and the point at which they strike the surface of solar collector under test 93. The angle of rotation of lamp array frame 39 and the pivot angle of lamp array frame base 33 and the pivot angles of lamp troughs 41 can be selected so that lamp array 3 approximates a distant point source (i.e., the sun) in the early morning or late afternoon hours or any other time of day.

Another arrangement for varying the angle of radiation 111 relative to the surface of solar collector under test 93 to produce a uniform intensity of radiation along the surface of the solar collector under test is shown in FIG. 8. As can be seen in FIG. 8, the plane of solar collector under test 93 again is parallel to the plane of lamp array 3. Therefore, the length of each of the parallel rays of radiation 111 is equal, and therefore the intensity of radiation received along the surface of solar collector 93 is uniform, just as it would be if radiation 111 were received from the distant sun.

Figure 10:
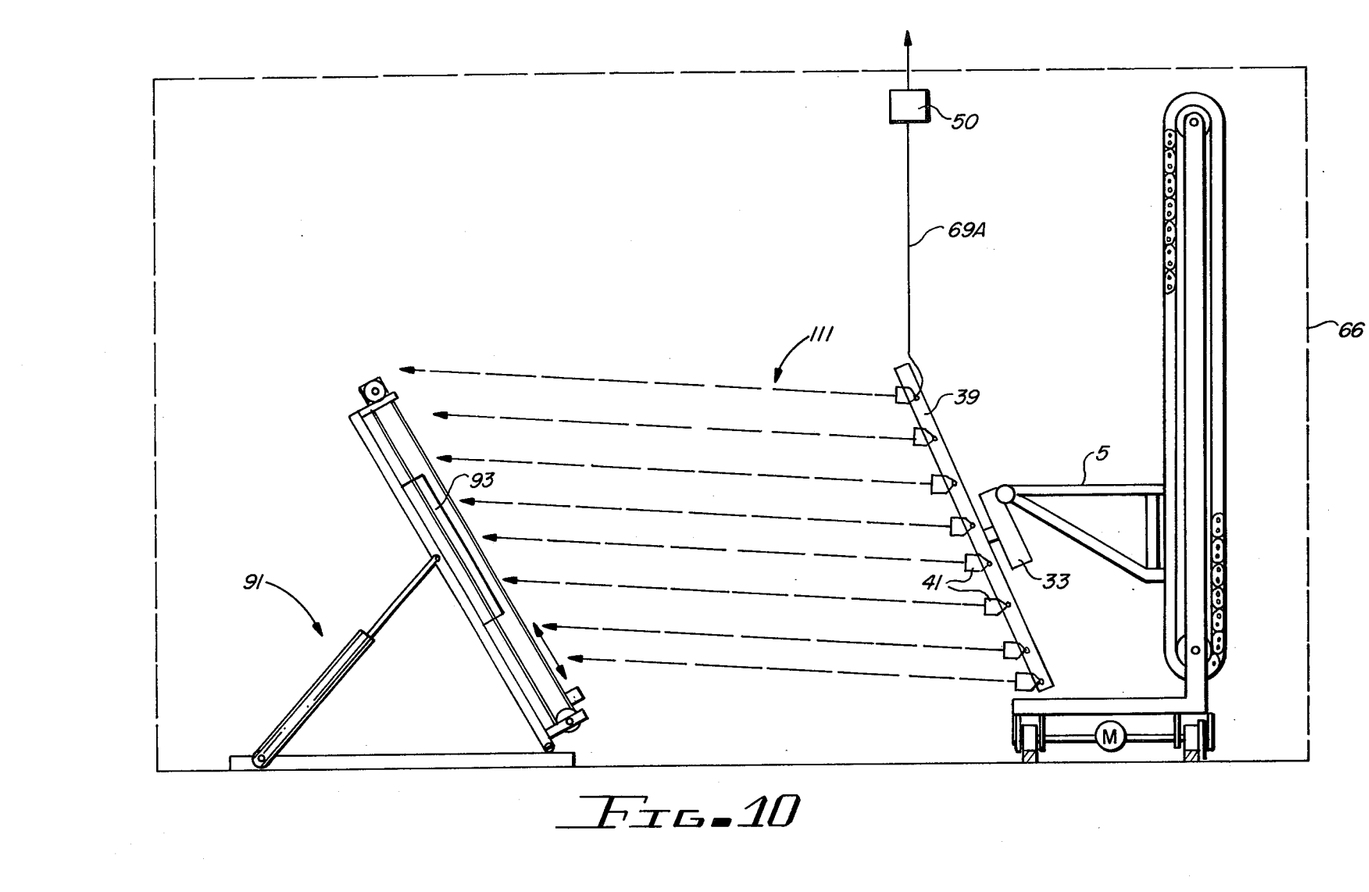
FIG. 10 is a side view of the solar simulator and test stand of FIG. 8 adjusted to provide another angle of incidence.

In FIG. 10, lamp array frame 39 has been lowered from the position shown in FIG. 8 and the direction of the tilting of the troughs 41 has been reversed from that shown in FIG. 8 to show another useful way of situating test stand 91 and gantry crane 7. The arrangement of FIG. 10 has the advantage that the two fans 46 and 48 (shown in FIG. 6) and various other equipment that may be located near the base of test stand 91 will not become exposed to and heated by radiation from the lamp array. In certain instances, this might be advantageous. (If the amount of rotation of array frame 39 is limited to 90 degrees, as is the case in the presently implemented embodiment of the invention, the configuration of FIG. 10 may be practical and the configuration of FIG. 8 may not be practical if gantry crane 7 is moved to one end of rails 15).

In FIG. 10, reference numeral 66 designates an environmentally controlled building in which test stand 91 and gantry crane 7 are installed. Reference numeral 52 designates the exhaust hose shown in FIG. 3, and reference numeral 50 designates an exhaust blower which draws cooling air past the lamps and troughs 41, through hose 69A and out of building 66.

Now that the structure of solar simulator 1 has been described, its operation to effectively and accurately simulate a distant point source of radiation, i.e., the sun, under preselected conditions, such as time of day, ambient temperature, season and sky temperature, will be made with reference to the described structure. As already noted, gantry crane 7 causes array support arm 5 to be raised and lowered in the directions indicated by arrows 29 in FIG. 1. Lamp array 39 can be continuously tilted through angles ranging from approximately ±30 degrees from vertical by controlling the extension of pneumatic cylinder 31, as can be seen in FIGS. 1, 1A, 6 and 8. The orientation of all of the solar lamps 41 relative to the plane of lamp array 39 is controlled by tilting lamp troughs 41, causing them to tilt in either of the directions indicated by arrows 57, as shown in FIGS. 2, 7, and 8. Note that in FIG. 8 lamp array frame 39 has been rotated so that all of lamp troughs 41 are horizontal, whereas in FIG. 7, lamp array frame 39 has been rotated so that all of the lamp troughs 41 are vertical.

As previously explained, the entire lamp array frame 39 can be rotated clockwise or counterclockwise, as indicated in FIG. 5. Thus, it can be seen that the angle of incidence of the radiation 111 to the surface of collector 93 can be varied by controlling the tilt angle of pivot base 33, and thus of lamp array frame 39, and by controlling the tilt angles of the lamp troughs 41. The lengths of each of the parallel rays of light included in radiation 111 are equal as long as the plane of lamp array frame 39 remains parallel to the radiation receiving surface of collector 93. The length of each of the parallel rays, i.e., the effective distance between the lamp array source and the collector 93 to be tested, is controlled by varying the elevation of the array support arm 5 of gantry crane 7 and also by varying the lateral position of gantry crane 7 along rails 15.

The capability of tilting array frame 39 about hinge 35 and the capability of rotating array frame 39 on spindle 37 gives solar simulator 1 the capability of maintaining the plane of the array of solar lamps 61 parallel to the receiving surface of collector 93. The vertical and lateral movement of lamp array 39 achieved by means of gantry crane 7, in combination with the capability of tilting the individual lamp troughs 41 relative to the plane of array frame 39, facilitates control of the angle of incidence of radiation 111 relative to the surface of collector 93 and control of the intensity of radiation at the surface of collector 93.

It can be seen that the intensity of light received (i.e., energy per unit area) by the light receiving surface of collector 93 can be varied several different ways. Tilting of the troughs 41 increases or decreases the effective density of solar lamps as seen by the collector 93, so the intensity of light can be varied by simultaneously varying the tilt angle of array frame 39 and lamp troughs 41 so that the angle of incidence to solar collector 93 remains constant. The intensity of light received by solar collector 93 also can be varied by varying the distance along a direction axis between array frame 39 and solar collector 93; this can be accomplished by simultaneously varying the horizontal and vertical position of array frame 39 by means of gantry crane 7. Also, for the type of compact source iodide solar lamps mentioned above, the intensity can be varied significantly without materially varying the spectrum of the resulting light; therefore, some variation in light intensity received by solar collector 93 can be achieved by varying the power supplied to solar lamps 61. Finally, the spacing of lamps within each lamp trough 41 can be varied to vary the intensity of light received by solar collector 93.

The capability of solar simulator 1 to produce any desired angle of incidence of radiation on the collector 93 to maintain the radiation intensity uniform along the surface of the solar collector 93 enables the solar simulator 1 to be utilized to simulate a desired solar day without greatly varying the intensity of the lamps, and therefore without varying the spectrum of radiation received by the solar collector 93.

A typical method of utilizing the above described system includes connecting solar collector 93 up to an inlet pipe (not shown) and an outlet pipe (also not shown) to cause low temperature water to flow into solar collector 93 at a predetermined flow rate. The temperature of the water at the inlet is measured. The temperature of water at the outlet of solar collector 93 after the water temperature thereat is measured after the temperature of water heated has had sufficient time to stabilize. The response of the temperature of water at the outlet is then measured in response to a "step function" increase in the intensity of radiation received from the solar lamp array 3.

The solar simulator 1 can be operated to provide a predetermined, uniform intensity level along the surface of solar collector 93 with a predetermined angle of incidence of simulated solar radiation 111 to the surface of solar collector 93. The incident radiation along the surface of solar collector 93 is by means of the pyranometers 96 on sensor support bar 97 (FIG. 9). The various motors and pneumatic cylinders that produce the desired elevation, lateral position, degrees of tilting of lamp array 39 and lamp troughs 41 and rotation of array frame 39 can be manually or automatically adjusted to provide the desired intensity as measured by the pyranometers.

It has been found that the effective "sky" radiation temperature for the described solar simulator 1, when operated in the above mentioned environmental building, ranges from 0 to 20 degrees Fahrenheit above the ambient temperature, whereas, the typical outdoor sky temperature varies from approximately ten degrees to thirty degrees below the ambient temperature at the installation site. The actual sky temperature can be more accurately simulated by several different techniques, which include cooling the walls of the environmental building or placing suitable glass or plastic filters between the lamp array 3 and the collector 93.

In accordance with the present invention, a thin (¼ to ½ inch) plexiglass infrared filter, designated by reference numeral 82 in FIG. 6, is mounted on suitable posts such as 84 and 86 at a distance of approximately three to six feet from the radiation-receiving surface of solar collector 93. The plexiglass is composed of a resin manufactured by Rohm and Haas and cast by Polycast, Inc., and is referred to as a "UV (ultraviolet) transmitting plexiglass sheet". A fan 48 is positioned as shown in FIG. 6 to blow cool ambient air in the direction indicated by arrow 48' along the surface of infrared filter 82 closest to solar collector 93 in order to maintain the temperature of infrared filter 82 between approximately zero and five degrees above the ambient temperature near solar collector 93. This condition has been found to accurately simulate the sky temperature that would be "seen" by the radiation-receiving surface of solar collector 93 when it is installed outdoors. This method of providing the appropriate apparent sky temperature causes the losses due to re-radiation of energy by the solar collector 93 to be approximately equal to the loss due to re-radiation to the sky when solar collector 93 is mounted outdoors at the same ambient temperature.

Fan 46 in FIG. 6 blows air in the direction indicated by arrow 46' along the collecting surface of solar collector 93 to simulate normal wind conditions, as specified in ASHRAE 93-77, a test specification produced by the American Society of Heating, Refrigerating, and Air Conditioning Engineers, for flat, residential solar collectors.

The usefulness of the above described solar simulator system and method of operating will be better understood after the following discussion of formulas that describe the operation of flat plate solar collectors and the parameters that must be measured in order to compute the constants in the formulas.

The following formula is a fundamental efficiency equation for a solar collector:

$$\eta = \frac{E_{out}}{E_{in}} = \frac{\dot{m}C_p\Delta T}{I_t A}, \quad (1)$$

where $E_{out}$ is the energy flowing out of the device and $E_{in}$ is the energy flowing into the device, $\dot{m}$ is the mass flow rate of fluid (i.e., water) flowing through the collector, $C_p$ is the heat capacity of the fluid, $\Delta T$ is equal to $T_o - T_{in}$, the difference between temperature of water at the outlet temperature of water at the inlet of the collector. $I_t$ is the total incoming solar radiation, hereafter referred to as "insolation", and A is the area of the light-receiving surface of the collector.

The terms $\dot{m}$, $C_p$, $\Delta T$, $I_t$, and A are all easily measured parameters. The area A and the heat capacity $C_p$ can be determined before testing of the solar collector. The mass flow rate $\dot{m}$ of the water flowing into the inlet of the collector, the temperature difference $\Delta T$, between the water inlet and outlet, and the solar radiation $I_t$ at the light receiving surface of the solar collector can be easily measured during testing of the solar collector.

Another known equation that defines the operation of a particular type of solar collector known as a flat plate solar collector, of the type including a flat transparent cover, a black absorber, a space between the cover and the absorber, fluid tubes thermally connected to the absorber, and an insulated housing, is given by the equation $$\eta = K_{\alpha\tau} \cdot \alpha \cdot \tau \cdot F_R - \frac{F_R \cdot U_L \cdot (T_i - T_A)}{I_t}, \quad (2)$$

where $\eta$ is the efficiency, as above, is the transmittance of the transparent cover for normal (i.e., perpendicular) incident light radiation, $\alpha$ is the absorbtance of the solar collector, $F_R$ is heat removal factor for flow of the heat absorbed by the absorber to the fluid (i.e., water) flowing through the collector, $I_t$ is the insolation defined as before, $T_i - T$ is the difference between the inlet water temperature and the ambient temperature, $U_L$ is the heat loss coefficient of the insulated housing, and $K_{\alpha\tau}$ is the "incident angle modifier", which is a number that is a constant for a fixed incident angle of solar radiation received by the collector, but varies as a function of incident angle. $K_{\alpha\tau}$ has a value of 1.0 for received radiation (note that the terms "light" and "radiation" are used interchangeably herein) that is perpendicular to the radiation receiving surface or cover of the flat plate solar collector, and is given by the formula $$K_{\alpha\tau} = 1 - b_o\left(\frac{1}{\cos\theta} - 1\right), \quad (3)$$

where $\theta$ is the deviation of the angle of the incident solar radiation from perpendicular to the radiation-receiving cover of the flat plate solar collector.

It can be seen that equation (2) is the linear equation of a straight line, and has the classical form $y = mx + b$, where b is the Y intercept and m is the slope. Thus, in equation (2), the term $K_{\alpha\tau} \cdot \alpha \cdot \tau \cdot F_R$ is the y intercept and $F_R \cdot U_2$ is the slope. X is equal to $$\frac{T_i - T_A}{I_t}$$

and is the "X" variable, referred to as the "inlet parameter."

The intercept $K_{\alpha\tau} \cdot \alpha \cdot \tau \cdot F_R$ can easily be obtained experimentally by causing the inlet temperature $T_i$ to be equal to the ambient temperature $T_A$, causing the second term on the right hand side of equation (2) to be zero. The value of the efficiency $\eta$ can be plotted for other values of $T_i$, and this results in a straight line with a negative slope. Upon plotting of this line, the value of the term $F_R \cdot U_L$ can be obtained. It should be noted that the intercept $K_{\alpha\tau} \cdot \alpha \cdot \tau \cdot F_R$ has a different value for each different incident angle of the incoming solar radiation. Thus, plotting of equation (2) for different values of $\theta$ results in a family of parallel straight lines, the highest line corresponding to the incident angle corresponding to $\theta$ equal to zero, i.e., normal (perpendicular to the cover) radiation.

It can be seen that equation (3) also is a straight line having a negative slope, where the y intercept is 1.0, the slope is $-b$, and the "X" variable is $$\left( \frac{1}{\cos\theta} - 1 \right),$$

which is a well-known optical parameter. The value of the slope $-b$ can be obtained from a plot that can be made of $K_{\alpha\tau}$ versus $$\left( \frac{1}{\cos\theta} - 1 \right).$$

That plot can be obtained by means of the foregoing equations. The Y intercept is, of course, 1.0. For the condition that $T_i$ equals $T_A$, equation (1) can be set equal to equation (2) to obtain the equation $$\frac{\dot{m} C_p \Delta T}{I_{t\theta}} = K_{\alpha\tau\theta} \cdot \tau \cdot \alpha \cdot F_R, \qquad (4)$$

where $I_{t\theta}$ and $K_{\alpha\tau\theta}$ are the values of those variables at particular incident angles represented by $\theta$. By measuring the values of mass flow rate $\dot{m}$, temperature difference $\Delta T$, and the value of insolation $I_t$ at $\theta = 0$, the value of the term $\tau \cdot \alpha \cdot F_R$ can be determined, since $K_{\alpha\tau\theta}$ is equal to 1.0 at $\theta = 0$. For other values of $\theta$, the left hand side of equation (4) can be measured, and additional values of $K_{\alpha\tau\theta}$ then can be obtained, so that a graph of equation (3) can be plotted. The value of the slope $b$ can be determined from that graph.

Once the constants of equations (2) and (3) are determined in the manner described above, equation (3) can be substituted into equation (2) and a single formula for efficiency of flat plate solar collector has been obtained, so that the performance of any flat plate solar collector can be obtained for any incident angle, any ambient temperature, and any level of solar radiation.

The above described solar simulator system and method of operating thus provides accurate measurements of the quantities needed to compute the constants of the above formulas (2) and (3) and thereby allow complete characterization of any flat plate solar collector. No other known solar simulator is capable of accurately measuring response of solar collector at varying incident angles in such a manner to allow an accurate determination of the incident angle modifier $K_{\tau\alpha}$, which must be accurately known in order to completely characterize operation of a flat plate solar collector that is mounted in a fixed orientation.

While the invention has been described with reference to a particular embodiment thereof, those skilled in the art will be able to make various modifications to the disclosed solar simulator system and operating method without departing from the true spirit and scope of the invention.

We claim:

1. A solar simulator for producing a radiation spectrum that is similar to the solar spectrum, said solar simulator comprising in combination:
   (a) a plurality of spaced solar lamps that each produce a spectrum similar to the solar spectrum, each of said solar lamps having a direction axis along which light emitted by that solar lamp travels;
   (b) an array frame for supporting said plurality of solar lamps, said solar lamps being arranged to form a lamp array;
   (c) a plurality of lamp support means pivotally connected to said array frame for supporting said plurality of lamps in a plurality of predetermined orientations relative to a plane of said array frame;
   (d) lamp orientation maintaining means connected to said lamp support means for controllably, continually maintaining the orientations of said lamps so that the direction axes of said respective lamps are parallel to each other;
   (e) array frame support means pivotally connected to said array frame for supporting said array frame in a predetermined orientation so that the plane of said array frame is parallel to a light-receiving surface of an object to be tested;
   (f) vertical positioning means for raising said lamp array to a predetermined elevation relative to said object; and
   (g) horizontal positioning means for horizontally moving said lamp array to a predetermined lateral position relative to said object,
said predetermined elevation, said predetermined lateral position, and said plurality of predetermined orientations having values that cause the intensity of light received from said lamps on the surface of said object to be uniform, to have a predetermined intensity, and to have a predetermined angle of incidence to the surface of said object.

2. The solar simulator of claim 1 wherein said lamp support means includes a plurality of lamp trough means pivotally connected to said array frame for supporting respective ones of a plurality of groups of said solar lamps, each of said lamp trough means partially surrounding the solar lamps of a respective one of said groups and guiding cooling air past the solar lamps of that group to conduct heat way from those solar lamps.

3. The solar simulator of claim 2 wherein said plurality of lamp trough means are parallel, and wherein said lamp orientation maintaining means includes means connected to a motor element for effecting controlled tilting of said plurality of lamp support means relative to the plane of said array frame.

4. The solar simulator of claim 3 including a gantry device including said elevation means and said horizontal position means.

5. The solar simulator of claim 4 wherein said array frame support means includes horizontal pivot means connecting said array frame support means to said vertical positioning means for effecting pivoting of said array frame support means about a horizontal axis.

6. The solar simulator of claim 5 wherein said array frame support means includes rotary means attached to said array frame for rotatably supporting said array frame and a motor element for effecting rotation of said array frame in its plane relative to said array frame support means.

7. The solar simulator of claim 1 including filtering means disposed between said lamp array and the surface of said object for filtering a portion of the light emitted by said solar lamps to cause the spectrum of light reaching the light receiving surface of said object to more closely approximate the sun's solar spectrum.

8. The solar simulator of claim 1 wherein each of said solar lamps is a compact source iodide lamp.

9. The solar simulator of claim 7 including cooling means for cooling said filtering means to a temperature that causes re-radiation of energy from said light-receiving surface of said object to occur at approximately the same rate as would occur for a normal sky temperature if said object were mounted outdoors.

10. The solar simulator of claim 9 wherein said filtering means includes a sheet of plastic that filters a portion of the infrared light from light emitted by said solar lamps, and wherein said cooling means includes a blower for blowing cool air on a surface of said plastic sheet to cool it to a predetermined temperature.

11. A method of simulating solar radiation to test an object by utilizing a lamp array of solar lamps connected to an array frame, each solar lamp having a direction axis, said method comprising the steps of:
    (a) arranging the relative positions of the lamp array and the surface of the object so that a plane of the lamp array is parallel to the light collecting surface of the object, and so that the respective direction axes of each of a plurality of the solar lamps are parallel to each other and can all intersect a light receiving surface of the object substantially inclined at the same predetermined angle to the light receiving surface;
    (b) simultaneously tilting all of the solar lamps of the lamp array to aim the direction axes of the respective solar lamps onto the surface of the object so that the direction axes intersecting the light receiving surface remain sufficiently parallel to produce uniform intensity of light from the lamp array along the light receiving surface of the object, the distance between the surface of the object and the light emitting surface of one of the solar lamps along the axis of that lamp having a value that causes said uniform intensity to have a predetermined level when said solar lamps are on; and
    (c) applying substantially the same amount of electrical power to each of said solar lamps to turn said solar lamps on.

12. The method of claim 11 including the steps of gradually varying said predetermined angle and said distance while maintaining the amount of power applied to each of the lamps of the lamp array constant in order to simulate a solar day in a predetermined part of the world during a predetermined season.

13. A solar simulator for producing radiation spectrum to approximate the solar spectrum, said solar simulator comprising in combination:
    (a) a plurality of spaced solar lamps that each produce a spectrum that accurately approximates the sun's spectrum, each of said solar lamps having a direction axis;
    (b) an array frame for supporting said plurality of solar lamps, said solar lamps being arranged to form a lamp array;
    (c) a plurality of lamp support means pivotally connected to said array frame for supporting said plurality of lamps in a plurality of predetermined orientations relative to a plane of said array frame;
    (d) means connected to said lamp support means for controllably, continually maintaining the orientations of said lamps so that the direction axes of said respective lamps are parallel to each other;
    (e) means for adjusting the relative position of said array frame and an object to be exposed to light produced by said lamps so that a light-receiving surface of said object is parallel to the plane of said array frame, and so that the direction axis of each of said lamps makes a predetermined angle with the light receiving surface of the object and the distance along each of the direction axes between the surface of the object and a respective one of said lamps is a predetermined distance, to thereby produce uniform intensity of radiation along the surface of the test object.

* * * * *